United States Patent [19]

Brammer et al.

[11] Patent Number: 4,823,879

[45] Date of Patent: * Apr. 25, 1989

[54] GUIDELINELESS REENTRY SYSTEM WITH NONROTATING FUNNEL

[75] Inventors: Norman Brammer, Turriff, Scotland; Charles E. Jennings, Houston, Tex.

[73] Assignee: Vetco Gray Inc., Houston, Tex.

[*] Notice: The portion of the term of this patent subsequent to Apr. 25, 2006 has been disclaimed.

[21] Appl. No.: 106,837

[22] Filed: Oct. 8, 1987

[51] Int. Cl.$^4$ .............................................. E21B 43/01
[52] U.S. Cl. ..................... 166/341; 166/349; 166/359
[58] Field of Search ............... 166/341, 345, 342, 343, 166/349, 339, 359; 285/24, 27; 405/169

[56] References Cited

U.S. PATENT DOCUMENTS

| | | | |
|---|---|---|---|
| 3,500,906 | 3/1970 | Peterson | 166/341 |
| 3,517,738 | 6/1970 | Peterson | 166/349 |
| 3,675,713 | 7/1972 | Watkins | 285/18 X |
| 3,688,840 | 9/1972 | Curington et al. | 166/341 |
| 4,167,215 | 9/1979 | Thorne | 166/341 |
| 4,171,922 | 10/1979 | Coulboy et al. | 166/341 X |
| 4,375,835 | 3/1983 | Archer | 166/359 X |
| 4,399,872 | 8/1983 | McConaughy et al. | 166/341 |
| 4,609,046 | 9/1986 | Schawann et al. | 166/341 |
| 4,662,785 | 5/1987 | Gibb et al. | 405/195 |

OTHER PUBLICATIONS

Drawing-Technip Geoproduction Swims.
Vetco Gray General Catalog 1986-1987.

*Primary Examiner*—Hoang C. Dang
*Attorney, Agent, or Firm*—James E. Bradley

[57] ABSTRACT

A guidelineless reentry system for a subsea well uses a downward facing funnel. A guide ring is mounted to the guide frame, which in turn is mounted around a mandrel on the well. A funnel and a mandrel connector are carried by the riser. Once the riser lands on the guide ring, latches are actuated to connect the funnel to the guide ring. Then, the mandrel connector is lowered relative to the funnel into engagement with the mandrel. A cam moves dogs outward to engage grooves of the mandrel to lock the mandrel connector to the mandrel.

4 Claims, 3 Drawing Sheets

GUIDELINELESS REENTRY SYSTEM WITH NONROTATING FUNNEL

CROSS-REFERENCE TO RELATED APPLICATIONS

This application is being simultaneously filed with another application by the same inventors and entitled "Guidelineless Reentry System With Fixed Rollers"Ser. No. 106,838, filed Oct. 8, 1987. The same inventors have also filed a related application entitled "Guidelineless Reentry System With Retracting Rollers", Ser. No. 0.99,360, filed Sept. 21, 1987.

BACKGROUND OF THE INVENTION

1. Field of the Invention

This invention relates in general to subsea wells, and in particular to a system for reconnecting a riser from a floating vessel to a subsea well for workover operations.

2. Description of the Prior Art

In deep water offshore oil and gas wells, the Christmas tree of the well will often be located on the subsea floor. At times, a workover operation must be performed on the subsea well. When this is required, a floating vessel is positioned over the well. A string of riser pipe is lowered down into engagement with a mandrel on the subsea tree. Once in engagement, operations can be performed on the well.

If the system is a guidelineless system, there will be no guidelines extending upward from the subsea well structure to the surface. Generally, in a guidelineless system, a large upward facing funnel is mounted permanently on the subsea tree. The funnel, with the aid of television cameras, assists in guiding the lower end of the riser onto the mandrel of the subsea well. The funnel can be quite large, up to twelve feet in diameter. A funnel of this type is expensive to construct and is only used when a workover operation is performed.

Mounting a downward facing funnel on the riser would avoid the need for a permanent upward facing funnel on each well. However, a funnel rigidly mounted to the lower end of the riser would require an extra high mandrel extending above the control mechanisms on the tree, so as to insure that the funnel did not strike any of various control mechanisms on the side of the tree. Hydraulic connections must also be made up when the riser lands on a mandrel to connect the control of the tree to the floating platform. Orienting the funnel onto the mandrel of the Christmas tree without damage to the hydraulic manifold or valve block would be a problem.

There have been proposals to make the funnel retractable. The funnel would be located on the lower end of the riser, but would be vertically movable relative to the lower end of the riser by means of hydraulic rams. The funnel is lowered in an extended position. Once proper orientation has been made, the funnel would be retracted. During retraction, the riser and mandrel connector lower down into engagement with the mandrel. While these proposals have merit, improvements are desirable.

SUMMARY OF THE INVENTION

The guidelineless reentry system of this invention utilizes a nonrotating funnel. The mandrel has a guide ring encircling it and facing upward. The riser has a funnel that faces downward. Hydraulic rams allow the mandrel connector and the riser to move downward relative to the funnel after the funnel has landed on the guide ring.

After the funnel has landed on the guide frame, a hydraulic ram pushes a plurality of latches inward. The latches grip a shoulder formed on the guide ring. Th latches aid in causing the funnel to align vertically and also secure the funnel to the guide ring. The riser is then rotated, with the funnel remaining stationary. The riser rotates until a key enters a slot in the guide ring. Then the riser and mandrel connector move downward to seat onto the mandrel.

DESCRIPTION OF THE PREFERRED EMBODIMENT

Figure 1:
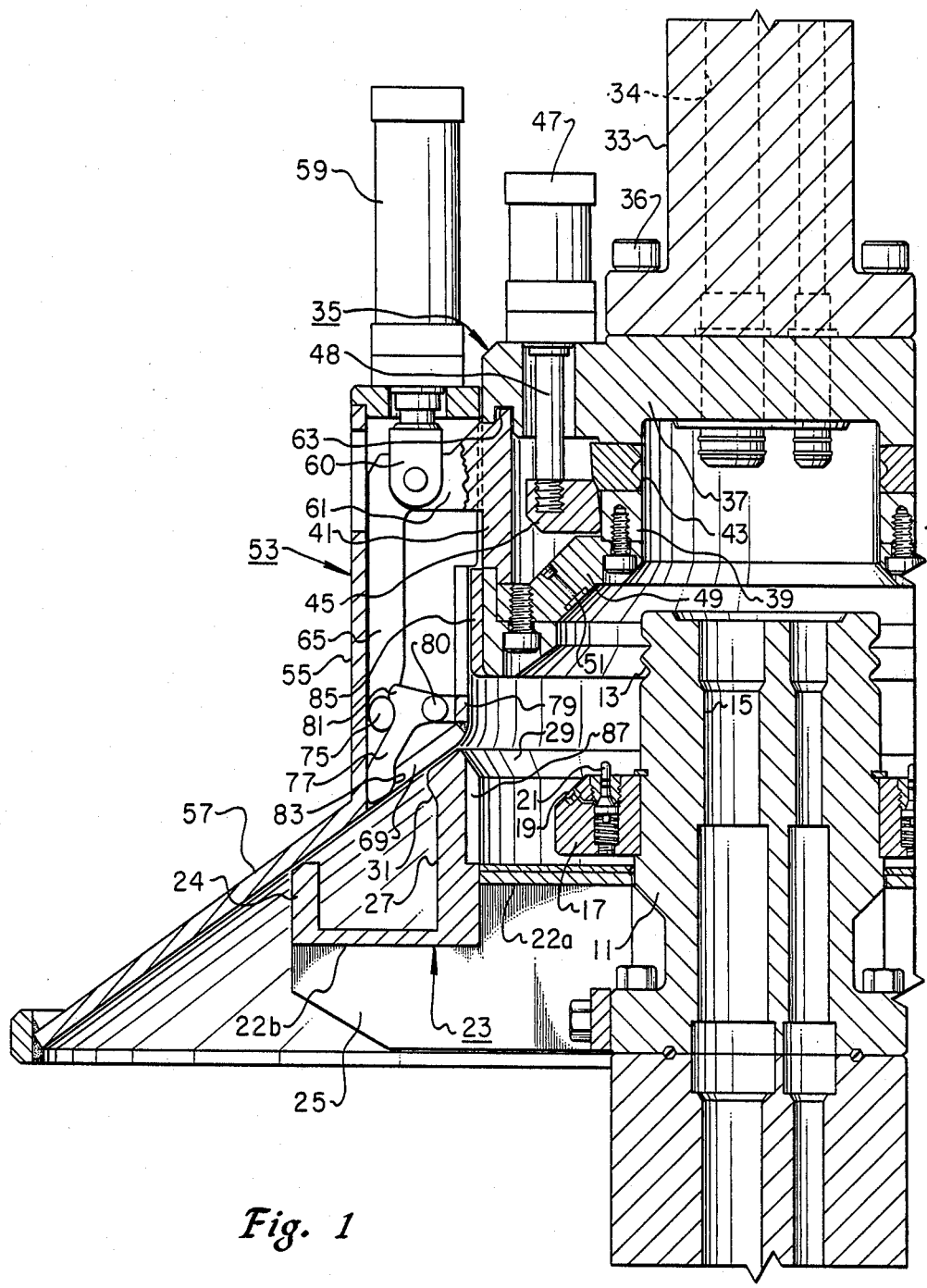
FIG. 1 is a vertical sectional view of a guidelineless reentry system constructed in accordance with this invention.

Referring to FIG. 1, the subsea well includes an upward extending mandrel 11. Mandrel 11 is a tubular member having a plurality of circumferential grooves 13 on its exterior near the upper end. Passages 15 extend through the mandrel 11 for communicating with the well. Normally, a cap (not shown) of some type will be located on top of the mandrel 11 and will be removed when the workover operation is beginning.

A cone seal manifold 17 is muunted to the exterior of mandrel 11. Manifold 17 is an annular member with an upward and outward facing conical exterior. Manifold 17 has a plurality of passages 19 extending through it and spaced around its circumference. Each passage 19 contains a check valve 21. The passages 19 lead to lines (not shown) which lead to various other equipment, such as control valves, on the subsea well. A cone seal manifold 17 of this type is described in more detail in pending U.S. patent application Ser. No. 941,260, filed Mar. 27, 1987, Charles E. Jennings.

A guide frame 23 is mounted to the mandrel 11. Guide frame 23 is an assembly which includes an inner annular plate 22a that extends outward from the mandrel 11. An outer annular plate 22b joins the inner plate 22a and is slightly lower. An upright annular ring or rim 24 extends upward from the outer edge of outer plate 22b, forming the periphery of the guide frame 23. Gussets 25 are spaced around the bottom of the guide frame 23 to provide support.

The assembly of guide frame 23 includes a guide ring 27, which is mounted on the upper side of the guide frame 23. Guide ring 27 is a solid annular cylindrical ring. It has a beveled surface 29 on the inner upper edge. An external shoulder 31 is located on the outer side of guide ring 27 and faces downward. The guide ring 27 is located about halfway between the rim 24 of the guide frame 23 and the mandrel 11. The diameter of the guide ring 27 is considerably greater than the diameter of the mandrel 11, but considerably less than the outer diameter of the guide frame 23.

The height of the guide ring 27 is important. The top of the guide ring 27 is lower than the grooves 13 and slightly higher than the cone seal manifold 17. The height and radial position of the guide ring 27 are selected so that a straight line extending from the upper edge of rim 24 to the upper outer edge of the mandrel 11 and to the axis of mandrel 11 would touch the upper edge of the guide ring 27. This straight line is thus tangent to the periphery of the guide frame 23, the top of the guide ring 27 and the rim of mandrel 11. If this straight line is revolved around the axis of the mandrel 11, it generates a conical surface.

A riser 33 is shown being lowered from a floating vessel (not shown). Riser 33 is made up of sections of conduit. Passages 34 extend through the riser 33 for communication with the passages 15 in the mandrel 11. A mandrel connector 35 is rigidly mounted to the lower end of the riser 33 by bolts 36. The mandrel connector 35 has a top or upper plate 37 which is adapted to land on the top of the mandrel 11. A cylindrical inner sidewall 39 extends downward from the top 37. The inner diameter of the inner sidewall 39 is slightly greater than the outer diameter of the mandrel 11, allowing the inner sidewall 39 to slide down over the mandrel 11. A cylindrical outer sidewall 41 is spaced outward from the inner sidewall 39 and depends from the top 37.

A plurality of dogs 43 are carried in windows in the inner sidewall 39. Each dog 43 has grooves on its inner face for engaging the grooves 13. Each dog 43 will move radially between an outward retracted position shown in FIGS. 1 and 2 and an inward locked position shown in FIG. 3.

The dogs 43 are moved inward by means of a cam member 45. Cam member 45 is a ring positioned in the clearance between the inner sidewall 3 and outer sidewall 41. Cam member 45 has an inclined inner face which engages the outer side of each dog 43. A plurality of hydraulic cylinders 47 (only one shown) are mounted to the top 37. Each hydraulic cylinder 47 has a shaft 48 which is connected to the cam member 45 for raising the cam member to push the dogs 43 inward.

A manifold connector 49 is rigidly mounted to the mandrel connector 35. The manifold connector 49 is a metal block having a conical inner side that faces downward and inward. A plurality of passages 51 extend through the manifold connector 49. The passages 51 are connected to lines (not shown) which lead to the floating vessel for supplying hydraulic fluid. The passages 51 are positioned to align and register with the passages 19 in the cone seal manifold 17.

An upper guide frame or funnel 53 is carried by the mandrel connector 35. Funnel 53 has an upper cylindrical portion 55. The cylindrical portion 55 is closely and slidingly carried on the outside of the mandrel connector outer sidewall 41. A lower frustoconical portion 57 extends downward from the cylindrical portion 55. The conical portion 57 faces downward. The conical portion 57 is formed at a degree so that it will contact the guide frame rim 24 and the guide ring 27. It diverges from the axis of riser 33 at the same angle as the line previously described that extends across the upper edges of the mandrel 11, guide ring 27 and the rim 24 of the guide frame 23. Conical portion 57 is considerably larger in diameter than the guide frame 23.

A plurality of hydraulic cylinders 59 (only one shown) are mounted to the top of the funnel 53. Each Hydraulic cylinder 59 has a shaft 60 that extends downward and is secured to a bracket 61. Bracket 61 is rigidly mounted to the outer sidewall 41 of mandrel connector 35. The outer sidewall 41 moves vertically with the mandrel connector 35. However, the inner sidewall 39 and top 37 are rotatable relative to the outer sidewall 41. The upper edge of the outer sidewall 41 inserts into a groove 63 in the top 37 to allow rotation of the riser 33 and the mandrel connector 35 relative to the outer sidewall 41.

A plurality of fingers 65 (only one shown) are located within the cylindrical portion 55 between the cylindrical portion 55 and the mandrel connector outer sidewall 41. The fingers 65 are evenly spaced around the funnel 53. The upper end of each finger 65 is mounted to bracket 61 for movement therewith. Each finger 65 is capable of vertical movement relative to the funnel 53 but cannot rotate relative to the funnel 53. Each finger 65 is adapted to extend downward through an aperture 69 located at the upper end of the conical portion 57.

Each finger 65 is a rectangular shaft. A pair of lugs 75 are located on the opposite sides of the lower end of each finger 65. Each lug 75 (only one shown) is a pin that protrude laterally from the finger 65 a short distance.

Each finger 65 slidingly engages a latch 77. Each latch 77 is pivotally mounted by a pin 80 to a bracket 79. Each bracket 79 is rigidly mounted to the lower end of the funnel cylindrical portion 55. Each latch 77 has a pair of spaced apart vertical ears 81 (only one shown). The ears 81 are located on the outer side of the latch 77. The finger 65 fits between the ears 81 and will slide vertically relative to the latch 77. The lugs 75 of the fingers 65 bear against the lower edges of the ears 81 when the fingers 65 are retracted as shown in FIG. 1.

Each latch 77 has a lip 83 on its lower inner edge. The lip 83 will engage the guide ring shoulder 31 when the latch 77 is pivotted inward to the locked position shown in FIGS. 2 and 3. The latch 77 pivots about the pin 80 between the retracted position shown in FIG. 1 and the locked position shown in FIGS. 2 and 3.

A key 85 is rigidly mounted to the mandrel connector 35 below the rotating outer sidewall 41. Key 85 will not rotate relative to the connector 35. It slidingly engages the beveled surface 29 of the guide ring 27 when the riser 33 is rotated, until reaching a slot 87. The slot 87 is located on the inner sidewall of the guide ring 27.

In operation, the tree cap (not shown) will first be removed from the tree mandrel 11 by various means. Then, the riser 33 is lowered from a floating vessel downward to approximately the point shown in FIG. 1. Television cameras will assist in guiding the funnel 53 over the guide ring 27 and in making an approximate orientation. The funnel 53 may be misaligned, and it may even contact the upper edge of the mandrel 11 initially. However, farther downward movement will cause it to slide down and land on the guide ring 27. When landed, as shown in FIG. 1, the conical portion 57 will be in contact with the guide ring 27 and also the rim 24 of the guide frame 23.

Then, hydraulic fluid pressure is supplied to the hydraulic cylinders 59. This results in the fingers 65 moving downward to an intermediate position shown in FIG. 2. As the fingers 65 move downward, they slide downward between the ears 81 of the latches 77. Each finger 65 serves as cam means for moving one of the latches 77 between the retracted and locked positions. The inner surface of each finger 65 pushes on the outer surface of a latch 77, causing each latch to pivot inward. The lip 83 engages the shoulder 31, latching the funnel 53 to the guide ring 27. This latching action also serves to straighten the funnel 53 on the guide frame 23.

Figure 2:
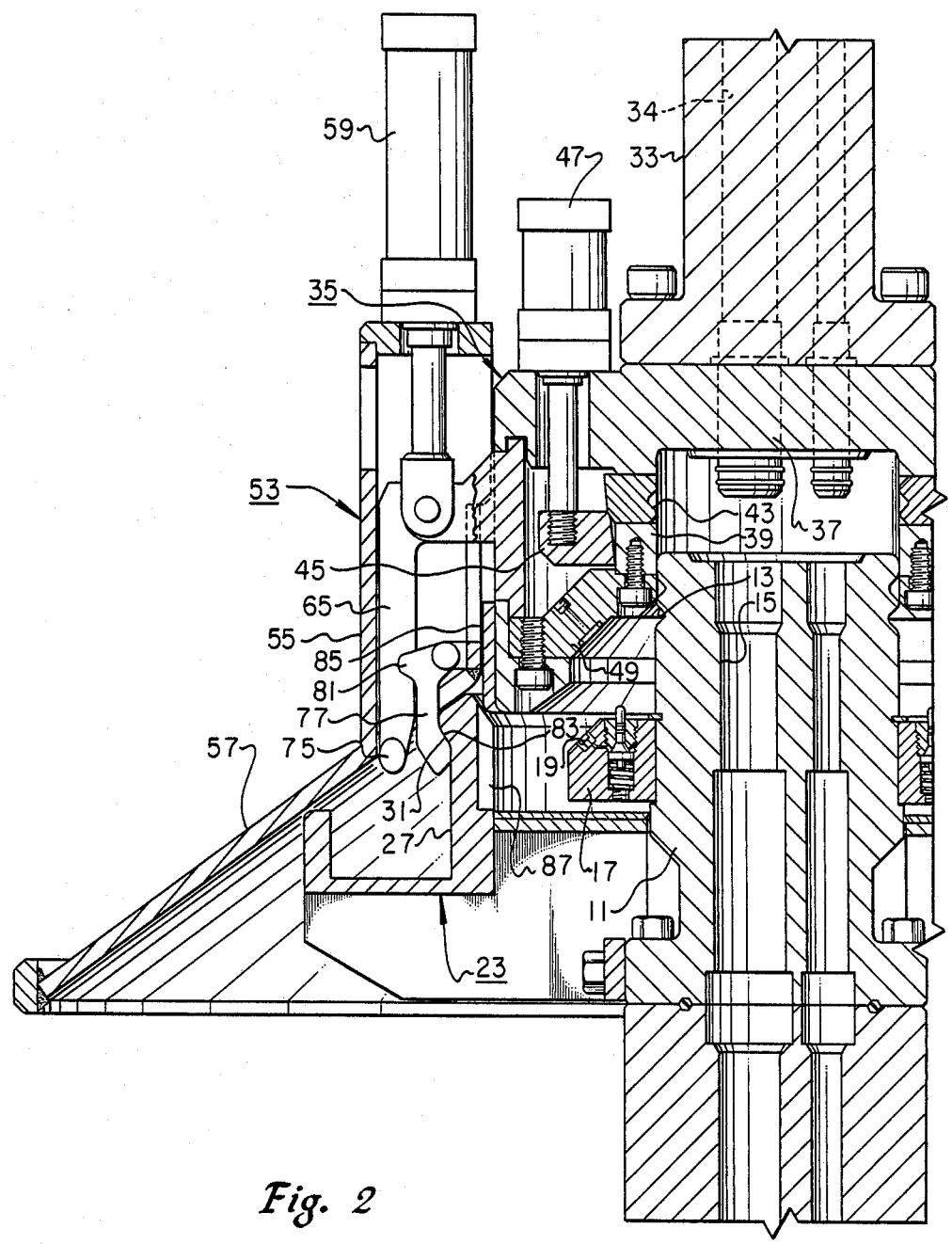
FIG. 2 is a sectional view of the system of FIG. 1, but showing the latches engaging the guide ring.

The riser 33 and the mandrel connector 35 will move downward with the fingers 65. After the latches 77 have engaged the shoulder 31, the key 85 will contact the guide ring beveled surface 29. The key 85 will prevent any farther downward movement of the mandrel connector 35 as long as the key 85 is bearing against the beveled surface 29. This position is shown in FIG. 2. As the mandrel connector inner sidewall 39 slides over the upper part of mandrel 11, the close fit further causes the funnel 53 to straighten on the mandrel 11.

Figure 3:
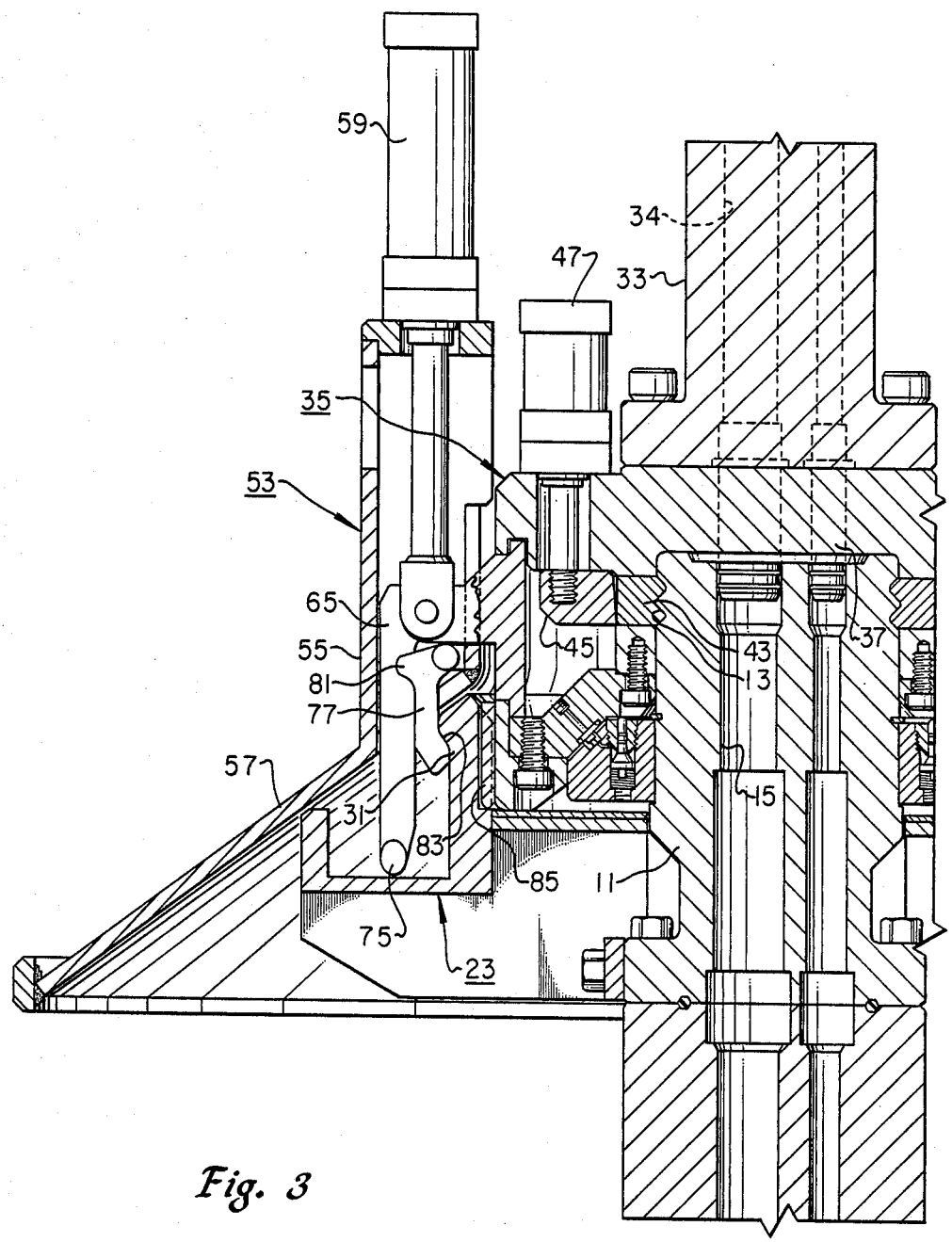
FIG. 3 is a sectional view of the system of FIG. 1, showing the mandrel connector landed on and locked to the mandrel.

After the latches 77 have engaged the guide ring 27, and the key 85 has landed on the guide ring 27, the riser 33 is rotated in a horizontal plane perpendicular to the longitudinal axis of mandrel 11. The mandrel connector 35 and key 85 will rotate relative to the guide ring 27. The funnel 53 will not rotate. The latches 77 serve as means to restrict such rotation because of the engagement of the latches 77 with the guide ring 27. When the key 85 reaches the slot 87, then it will be free to slide into the slot 87. The weight of the mandrel connector 35 allows the riser 33 to move downward until the connector top 37 seats on the mandrel 11 as shown in FIG. 3. The passages 15 and 34 will be in alignment at this point.

Then, hydraulic fluid pressure is supplied to the hydraulic cylinders 47. This causes the cam 45 to lift, pushing the dogs 43 inward. The dogs 43 engage the grooves 13 in the mandrel 11. This causes the manifold connector 49 to tightly seal against the cone seal manifold 17 as shown in FIG. 3. Hydraulic fluid communication is thus established from the surface vessel to the controls on the well. Workover operations may then take place.

After the workover operations have been completed, the mandrel connector 35 is released by supplying hydraulic fluid to hydraulic cylinders 47 to cause them to move downward. This moves the cam 45 downward, freeing the dogs 43 to move outward. Hydraulic fluid is supplied to hydraulic cylinders 59, causing the fingers 65 to retract upward. The lugs 75 will contact the ears 81, pivoting the latches 77 outward to the retracted position. No portion of the latches 77 protrudes into the interior of funnel 53 when the latches 77 are retracted. The mandrel connector 35 moves upward with the fingers 65 to disengage from the mandrel 11. The riser 33 may then be picked up.

The invention has significant advantages. Allowing the mandrel connector to rotate relative to the funnel avoids the need for rollers for rolling on the guide ring. The latching of the funnel to the guide ring provides alignment and assures that the alignment remains while the mandrel connector is being actuated.

While the invention has been shown in only one of its forms, it should be apparent to those skilled in the art that it is not so limited, but is susceptible to various changes without departing from the scope of the invention.

We claim:

1. An apparatus for connecting a riser extending from a floating vessel to a subsea well assembly of the type having an upward extending tubular mandrel, comprising in combination:
   a guide frame assembly mounted to the mandrel;
   a mandrel connector mounted to the lower end of the riser for landing on the top of the mandrel to communicate the interior of the mandrel with the interior of the riser;
   connector means carried by the mandrel connector for engaging the sidewall of the mandrel to secure the mandrel connector to the mandrel;
   a downward facing guide funnel carried by the riser for insertion over the mandrel into engagement with the guide frame assembly;
   means for allowing rotation of the funnel relative to the riser and mandrel connector;
   latch means carried by the funnel for latching the funnel to the guide frame assembly before the connector means connects the mandrel connector to the mandrel, to prevent upward motion of the funnel relative to the guide frame assembly after the funnel has landed on the guide frame assembly, and for preventing rotation of the funnel relative to the guide frame assembly after the funnel is latched to the guide frame assembly to allow rotation of the riser and mandrel connector relative to the funnel and mandrel; and
   means carried by the funnel and the mandrel connector for moving the riser and mandrel connector downward relative to the funnel once the funnel has landed on the guide frame assembly and the mandrel connector has been rotated to the proper orientation, positioning the connector means around the mandrel to allow the connector means to operate to secure the mandrel connector to the mandrel.

2. An apparatus for connecting a riser extending from a floating vessel to a subsea well assembly of the type having an upward extending tubular mandrel, comprising in combination:
   a guide frame mounted to the mandrel;
   a guide ring mounted to the guide frame, encircling the mandrel and extending upward from the guide frame;
   a mandrel connector mounted to the lower end of the riser for landing of the top of the mandrel to communicate the interior of the mandrel with the interior of the riser;
   connector means carried by the mandrel connector for engaging the sidewall of the mandrel to secure the mandrel connector to the mandrel;
   a downward facing guide funnel carried by the riser for insertion over the mandrel into engagement with the guide ring, the riser and mandrel connector being rotatable relative to the funnel;
   a plurality of latches mounted to the funnel for movement between a locked position locking the funnel to the guide ring and a retracted position;
   cam means carried by the funnel for moving the latches between the retracted and locked positions, the cam means being vertically movable relative to the funnel and in unison with the mandrel connector, the mandrel connector being rotatable relative to the cam means and to the funnel;
   means carried by the funnel and the mandrel connector for moving the mandrel connector, riser and the cam means downward to an intermediate position relative to the funnel after the funnel has engaged the guide ring, to cause the cam means to move the latches to the locked position;
   the latches restricting rotation of the funnel and cam means relative to the guide ring once the latches have latched the funnel to the guide ring, allowing the riser and mandrel connector to be rotated relative to the mandrel to orient the mandrel connector; and
   means carried by the funnel and the mandrel connector for allowing the mandrel connector, riser and cam means to move farther downward from the intermediate position once the mandrel connector has been rotated to the proper orientation, positioning the connector means around the mandrel to allow the connector means to operate to secure the mandrel connector to the mandrel.

3. An apparatus for connecting a riser extending from a floating vessel to a subsea well assembly of the type having an upward extending tubular mandrel, comprising in combination:

a guide frame mounted to the mandrel;

a guide ring mounted to the guide frame, encircling the mandrel and extending upward from the guide frame;

a mandrel connector mounted to the lower end of the riser for landing on the top of the mandrel to communicate the interior of the mandrel with the interior of the riser;

connector means carried by the mandrel connector for mandrel connector to the mandrel;

a downward facing guide funnel carried by the riser and having a frusto-conical lower side for insertion over the mandrel into engagement with the guide ring, the riser and mandrel connector being rotatable relative to the funnel;

a plurality of latches pivotally mounted to the funnel for movement between a locked position locking the funnel to the guide ring and a retracted position;

cam means carried by the funnel and the mandrel connector for moving the latches between the retracted and locked positions, the cam means being vertically movable relative to the funnel and being vertically movable in unison with the mandrel connector, the mandrel connector being rotatable relative to the cam means and to the funnel;

means carried by the funnel and the mandrel connector for moving the mandrel connector, riser and the cam means downward relative to the funnel to an intermediate position after the funnel has engaged the guide ring to cause the cam means to move the latches to the locked position;

a slot formed in the guide ring;

the latches when in the locked position restricting rotation of the funnel relative to the guide ring, allowing the mandrel connector be rotated relative to the mandrel to orient the mandrel connector; and key means on the mandrel connector for engaging the guide ring and preventing farther downward movement of the mandrel connector from the intermediate position until the mandrel connector has been rotated to the proper orientation and the key means aligned with the slot, then for allowing the mandrel connector, riser and cam means to move farther downward until the mandrel connector lands on top of the mandrel, positioning the connector means around the mandrel to allow the connector means to operate to secure the mandrel connector to the mandrel.

4. A method for connecting a riser extending from a floating vessel to a subsea well assembly of the type having an upward extending tubular mandrel, comprising in combination:

mounting a guide frame assembly around the mandrel;

mounting a mandrel connector to the lower end of the riser;

mounting a downward facing guide funnel rotatably to the riser;

mounting a plurality of latches to the funnel for movement between retracted and locked positions;

landing the funnel on the guide frame assembly; moving the latches to the locked position, locking the funnel to the guide frame assembly; then rotating the riser and mandrel connector in a horizontal plane relative to the funnel and mandrel until the mandrel connector has oriented properly with the mandrel; then lowering the riser and mandrel connector relative to the funnel until the mandrel connector lands on the mandrel; then securing the mandrel connector to the mandrel.

* * * * *

UNITED STATES PATENT OFFICE
CERTIFICATE OF CORRECTION

Patent No. 4,823,879                     Dated 4/25/89

Inventor(s) Norman Brammer, et al

It is certified that error appears in the above-identified patent and that said Letters Patent is hereby corrected as shown below:

Column 2, Line 33, "muunted" should be --mounted--;

Column 7, Line 20, after "for", the following should be inserted --engaging the sidewall of the mandrel to secure the--.

Signed and Sealed this

Seventeenth Day of April, 1990

Attest:

HARRY F. MANBECK, JR.

*Attesting Officer*     *Commissioner of Patents and Trademarks*